United States Patent
Gijsman et al.

(10) Patent No.: US 8,975,325 B2
(45) Date of Patent: *Mar. 10, 2015

(54) HEAT STABILIZED MOULDING COMPOSITION

(71) Applicant: DSM IP Assets B.V., Heerlen (NL)

(72) Inventors: Pieter Gijsman, Beek (NL); Wilhelmus J. M. Sour, Maastricnh (NL); Rudy Rulkens, Cadier en Keer (NL); Robert H. C. Janssen, Elsloo (NL)

(73) Assignee: DSM IP Assets B.V., Heerlen (NL)

( * ) Notice: Subject to any disclaimer, the term of this patent is extended or adjusted under 35 U.S.C. 154(b) by 0 days.

This patent is subject to a terminal disclaimer.

(21) Appl. No.: 14/294,086

(22) Filed: Jun. 2, 2014

(65) Prior Publication Data

US 2014/0288224 A1  Sep. 25, 2014

Related U.S. Application Data

(63) Continuation of application No. 11/794,334, filed as application No. PCT/EP2006/000186 on Jan. 9, 2006, now Pat. No. 8,772,397.

(30) Foreign Application Priority Data

Jan. 12, 2005 (EP) ..................................... 05075064

(51) Int. Cl.
*C08K 3/08* (2006.01)
*C08L 77/00* (2006.01)
*B29C 45/00* (2006.01)
*C08L 77/02* (2006.01)

(52) U.S. Cl.
CPC . *C08K 3/08* (2013.01); *C08L 77/00* (2013.01); *B29C 45/0001* (2013.01); *C08L 77/02* (2013.01); *C08L 2205/025* (2013.01); *C08L 2205/02* (2013.01); *C08K 2003/0856* (2013.01); *C08L 2201/08* (2013.01)
USPC ............ 524/440; 524/413; 524/439; 524/606

(58) Field of Classification Search
CPC .. C08K 3/08; C08K 2003/0856; C08L 77/00; C08L 2205/02; C08L 2205/025
USPC .................. 524/413, 439, 440, 606
See application file for complete search history.

(56) References Cited

U.S. PATENT DOCUMENTS

| | | | |
|---|---|---|---|
| 2,705,227 A | 3/1955 | Stamatoff | |
| 4,220,695 A | 9/1980 | Ishida et al. | |
| 4,248,763 A | 2/1981 | Yoshimura et al. | |
| 4,297,453 A | 10/1981 | Coran et al. | |
| 4,853,425 A | 8/1989 | Yoshimura et al. | |
| 5,145,904 A | 9/1992 | Muehlbach et al. | |
| 5,256,326 A | 10/1993 | Kuwato et al. | |
| 5,350,558 A | 9/1994 | Kuwato et al. | |
| 5,459,189 A | 10/1995 | Hagimori et al. | |
| 5,627,258 A | 5/1997 | Takayama et al. | |
| 6,198,377 B1 | 3/2001 | Yamazaki et al. | |
| 6,441,072 B1 | 8/2002 | Havenith et al. | |
| 7,763,674 B2 | 7/2010 | Gijsman et al. | |
| 8,772,397 B2 * | 7/2014 | Gijsman et al. | ............... 524/440 |
| 2001/0008914 A1 | 7/2001 | Osawa et al. | |
| 2002/0045688 A1 | 4/2002 | Galli et al. | |
| 2003/0027912 A1 | 2/2003 | Tung et al. | |
| 2003/0129428 A1 | 7/2003 | Tsai et al. | |
| 2004/0242737 A1 | 12/2004 | Topulos | |
| 2005/0250886 A1 | 11/2005 | Stoeppelmann et al. | |
| 2008/0262133 A1 | 10/2008 | Eibeck et al. | |

FOREIGN PATENT DOCUMENTS

| | | |
|---|---|---|
| EP | 0 287 045 | 10/1988 |
| EP | 0 437 851 | 7/1991 |
| EP | 0 505 162 | 9/1992 |
| EP | 1 262 525 | 12/2002 |
| GB | 1 225 860 | 3/1971 |
| GB | 1 552 096 | 9/1979 |
| JP | 09-221590 | 8/1997 |
| JP | 2000-086889 | 3/2000 |
| JP | 2002-069220 | 3/2002 |

OTHER PUBLICATIONS

Database WPI, Section Ch. Week 198720 Derwent Publications Ltd., XP002372893 & JP 62 079259 A, Apr. 11, 2987, Abstract.
Weber, J. N. 2011. Polyamides. Kirk-Othmer Encyclopedia of Chemical Technology. 1-63 (2011).
Allen et al, Polymer Degradation and Stability 23 (1989) 165-174.
Day et al, Polymer Degradation and Stability 46 (1995) 341-349.
Stanyl® Diablo: The polyamide with revolutionary high temperature oxidative stability, http://www.dsm.com/le/en_US/stanyl/html/diablo.htm (2012).

* cited by examiner

*Primary Examiner* — Vickey Nerangis
(74) *Attorney, Agent, or Firm* — Nixon & Vanderhye P.C.

(57) ABSTRACT

Non-fibrous-reinforced thermoplastic molding compositions comprising a metal powder as a heat stabilizer are provided. The metal powder has a weight average particle size (dm) of at most 1 mm and the metal in the metal powder is selected from the group consisting of elementary metals from Group VB, VIB, VIIB and VIIIB of the Periodic Table, and mixtures thereof. A thermoplastic polyamide is also provided with an Mw of at most 50,000 g/mol, or a blend of at least two thermoplastic polymers with Tmelt or Tg differing by at least 20° C., or a second thermostabilizer. The invention also relates to the use of these compositions in high temperature applications.

12 Claims, No Drawings

HEAT STABILIZED MOULDING COMPOSITION

This application is a continuation of commonly owned U.S. application Ser. No. 11/794,334, filed Feb. 11, 2008 (now U.S. Pat. No. 8,772,397), which is the U.S. national phase of International Application No. PCT/EP2006/000186 filed Jan. 9, 2006 which designated the U.S. and claims priority to EP Application No. 05075067.5 filed Jan. 12, 2005, the entire contents of each of which are hereby incorporated by reference.

The invention relates to thermo-stabilized thermoplastic moulding compositions comprising a thermoplastic polyamide and a heat stabilizing system comprising a finely dispersed metal powder and to the use of such moulding compositions in high temperature applications.

A high-temperature-use application for a moulded article is herein understood to be an application wherein the moulded article during its normal useful lifetime is in contact with a heat source which frequently attains and/or which attains for a longer period a temperature of at least 140° C. The heat source may be a heat producing device or a heated device or may be the surrounding environment wherein the moulded article is subjected to conditions with temperatures of at least 140° C. Such high-temperature-use applications are regularly met for articles used in the electro-, electronic, and automotive industry. Examples of heated devices or heat generating devices are engines, or elements thereof, and electronic devices such as semi-conductors. For the automotive segment high-temperature-use application are regularly found in so-called under-the-hood or under-the-bonnet applications, herein referred to as high temperature automotive applications. Therefore, the invention in particular relates to moulded articles for use in the electro-, electronic, and automotive industry.

Moulded articles for the electro, electronic and automotive industry and moulding compositions based on thermoplastic materials used for these applications generally have to comply with a complex property profile, including, for the compositions as moulded, good dimensional stability, high heat distortion temperature (HDT) and good mechanical properties, such as a high tensile strength, tensile modulus and fatigue. As indicated above, moulded articles that serve in automotive under-the-hood applications and in several electric or electronic applications can be subjected to relatively high temperatures for a prolonged period. The compositions generally tend to show a decrease in mechanical properties due to thermal degradation of the polymer. This effect is called heat ageing. This effect can occur to an undesirable extent. In particular with polyamides as the thermoplastic polymer, the deteriorating effect of exposure to high temperatures can be very dramatic. Generally the polyamide containing materials used for the indicated applications contain a heat stabilizer. The function of a heat stabilizer is to better retain the properties of the composition upon exposure of the moulded article to elevated temperature. When using a heat stabilizer, the useful lifetime of the moulded material can be extended significantly, depending on the type of material, use conditions and type and amount of heat stabilizer. Examples of heat stabilizers typically used in polyamides are organic stabilizers, like phenolic antioxidants and aromatic amines, and copper, either in the form of a copper salt in combination with potassium iodide or potassium bromide, or in the form of elementary copper. Phenolic antioxidants and aromatic amines are generally used for stabilisation at elevated temperatures up to about 130° C. Copper containing stabilizers are suitable for stabilisation at higher temperatures and have been available for many years.

Moulded articles for the electro, electronic and automotive industry, and a thermo-stabilized moulding composition comprising a thermoplastic polyamide and a copper based heat stabilizer used therefore are known from EP-0612794-B1. The thermoplastic polyamide in the known composition is an aliphatic or aromatic polyamide. As the heat stabilizer in the known composition, both copper iodide/potassium iodide and in-situ formed finely dispersed elementary copper are mentioned. The copper iodide/potassium iodide containing composition was formed by a compounding process comprising simply melt-mixing of the constituting components of the composition. The composition comprising elementary copper was formed by a compounding process, wherein the polyamide was melt-mixed with an ionic or complex copper stabilizer and a reducing agent, and wherein the elementary copper was formed in-situ. The known composition comprising in-situ prepared elementary copper is said in EP-0612794-B1 to have a much better resistance against thermal oxidation and influence of light than the copper salt/potassium iodide containing composition. The finely dispersed elementary copper is said to be only effective as a heat stabiliser when it is prepared in-situ. When elementary copper prepared in advance of the melt-mixing process, in casu by using colloidal copper in a melt-mixing process for preparing a heat stabilised composition, the heat ageing performance of that composition was not essentially better than that of the copper iodide/potassium iodide containing composition, as noted in EP-0612794-B1. The heat ageing performance of these materials was tested at a temperature of 140° C.

In many applications for thermoplastic moulding compositions, retention of mechanical properties after long-term exposure to temperatures as high as 160° C., or even 180° C.-200° C. and higher becomes a basic requisite. The number of specialty applications, requiring compositions with improved heat ageing properties is also increasing. A disadvantage of the moulded articles prepared with the known composition is that the thermal stability at higher temperatures is still too low.

The aim of the invention is therefore to provide moulding compositions, which have better heat ageing properties than the known compositions, thereby providing for the possibility to make moulded articles that can be used at higher continuous use temperatures than the moulded articles prepared with the known compositions.

This aim has been achieved with the use of a metal powder, wherein the metal powder has a weight average particle size (dm) of at most 1 mm and the metal in the metal powder is selected from the group consisting of elementary metals from Group VB, VIIB, VIIB and VIIIB of the Periodic Table, and mixtures thereof, for preparing thermo-stabilized thermoplastic moulding compositions, and with the thermo-stabilized thermoplastic moulding compositions according to the invention, comprising a metal powder, wherein the metal powder has a weight average particle size (dm) of at most 1 mm and the metal in the metal powder is selected from the group consisting of elementary metals from Group VB, VIIB, VIIB and VIIIB of the Periodic Table, and mixtures thereof.

Surprisingly, the metals of Group VB, VIIB, VIIB and VIIIB of the Periodic Table in the specified particle size range are very effective heat stabilizers. These metals will also be referred herein as "Group VB-VIIB transition metals". The metals of Group VB, VIIB, VIIB and VIIIB of the Periodic Table include the metals: Group VB: vanadium (V), niobium (Nb), tantalum (Ta); Group VI: chromium (Cr), molybdenum (Mo), and tungsten (W), Group VIIB: manganese (Mn), technetium (Tc) and rhenium (Re); and Group VIII: iron (Fe), ruthenium (Ru), osmium (Os), cobalt (Co), rhodium (Rh), iridium (Ir), nickel (Ni), palladium (Pd), and platinum (Pt). The effect of the use of these metals in their elementary state in the form of a metal powder having a weight average particle size (dm) of at most 1 mm in a thermoplastic moulding composition is a remarkable improvement in heat ageing properties, compared to the known copper salt/potassium iodide containing compositions as well as in respect of the known elementary copper containing compositions. This improvement in heat ageing properties is exhibited by a much better retention of the mechanical properties at elevated temperature. This effect is highly surprising since elementary metals like iron are known to have a deleterious effect on the melt stability of polymers like polyamides.

Moreover, this heat stabilizing effect is achieved even with moulding compositions which are prepared by a process involving simply melt-mixing of elementary metal with the other components of the composition. For obtaining the heat stabilizing effect according to the invention in-situ preparation of the finely dispersed elementary metal powder is not required. The compositions according to the invention may be prepared, for example, by using a metal powder finely dispersed in a carrier polymer.

Preferably, the metal powder that is used as a heat stabilizer comprises elementary iron, more preferably consists, at least essentially, of elementary iron.

The said metal powder of the metals of Group VB, VIIB, VIIB and VIIIB of the Periodic Table can advantageously be used in preparing a thermo-stabilized non-fibrous-reinforced thermoplastic moulding composition consisting of
  a) a polymer composition comprising at least one thermoplastic polyamide, and
  b) a thermo-stabilizing system, comprising a finely dispersed metal powder, and, optionally,
  c) non-fibrous inorganic fillers and/or
  d) other auxiliary additives, not comprising fibrous reinforcing agents, The invention in particular relates to a non-fibrous-reinforced thermoplastic moulding composition wherein
  a.1. the at least one thermoplastic polyamide has a weight average molecular mass Mw of at most 50,000 g/mol,
  b.1. the metal powder has a weight average particle size (dm) of at most 1 mm and the metal in the metal powder is selected from the group consisting of elementary metals from Group VB, VIIB, VIIB and VIIIB of the Periodic Table, and mixtures thereof, and
  c.1. the composition comprises at least 10 mass % non-fibrous filler, relative to the total mass of the composition.

The invention also relates to a non-fibrous-reinforced thermoplastic moulding composition wherein
  a.1. the at least one thermoplastic polyamide is a semi-crystalline polymer having a melting temperature (Tm-1) or an amorphous polymer having a glass transition temperature (Tg-1), wherein Tm-1 and Tg-1 together are denoted as T1,
  a.2. the polymer composition comprises a second thermoplastic polymer, being a semi-crystalline polymer having a melting temperature (Tm-2) or an amorphous polymer having a glass transition temperature (Tg-2), wherein Tm-1 and Tg-1 together are denoted as T2, and T2 is at least 20° C. lower than T1, and
  b.1. the metal powder has a weight average particle size (dm) of at most 1 mm and the metal in the metal powder is selected from the group consisting of elementary metals from Group VB, VIIB, VIIB and VIIIB of the Periodic Table, and mixtures thereof.

With the term melting temperature is herein understood the melting temperature measured according to ASTM D3417-97/D3418-97 by DSC with a heating rate of 10° C./minute and determined as the temperature with the highest melting enthalpy. With the term glass transition temperature is herein understood the temperature measured according to ASTM E 1356-91 by DSC with a heating rate of 20° C./minute and determined as the temperature at the peak of the first derivative (with respect of time) of the parent thermal curve corresponding with the inflection point of the parent thermal curve.

The invention also relates in particular to a non-fibrous-reinforced thermoplastic moulding composition wherein
  b.1. the metal powder has a weight average particle size (dm) of at most 1 mm and the metal in the metal powder is selected from the group consisting of elementary metals from Group VB, VIIB, VIIB and VIIIB of the Periodic Table, and mixtures thereof, and
  b.2. thermo-stabilizing system further comprises a second thermostabilizer.

The compositions according to the invention have in common the inventive feature that they comprise a thermo-stabilizing system comprising a finely dispersed metal powder wherein the metal powder has a weight average particle size (dm) of at most 1 mm and the metal in the metal powder is selected from the group consisting of elementary metals from Group VB, VIIB, VIIB and VIIIB of the Periodic Table, and mixtures thereof.

Compositions comprising a thermoplastic polyamide and finely dispersed elementary iron are known from several patent publications, for example, in U.S. Pat. No. 6,369,148 relating to mono-layer and multi-layered barrier materials used in film and foils for packaging applications. In these patent publications the elementary metal is used as an oxygen scavenger. The known compositions are said to be particularly suited for extrusion coating application in a wide variety of oxygen-scavenging packaging articles.

U.S. Pat. No. 6,369,148 does not describe the heat ageing effect of iron, or any of the other "Group VB-VIIB transition metals" as according to the present invention. U.S. Pat. No. 6,369,148 does neither describe non-fibrous-reinforced thermoplastic moulding compositions, suitable for injection moulding and comprising a Group VB-VIIIB transition metal, fillers and a thermoplastic polyamide with limited Mw, or comprising a Group VB-VIIIB transition metal and a copper salt or a second lower melting thermoplastic polymer, nor the good properties heat-ageing properties thereof and the suitability thereof for making moulded articles for high-temperature-use applications such as electronic parts and automotive under the hood parts.

In the context of the present invention a fibrous-reinforced thermoplastic moulding composition is understood to be a thermoplastic moulding composition comprising a fibrous reinforcing agent, whereas in analogy a non-fibrous-reinforced thermoplastic moulding composition is understood to be a thermoplastic moulding composition not comprising a fibrous reinforcing agent. A fibrous reinforcing agent is considered herein to be a material having length, width and thickness, wherein the average length is significantly larger than both the width and thickness. More specifically, a fibrous reinforcing agent is understood herein to be a material having an aspect ratio L/D, defined as the number average ratio between the length (L) and the largest of the width and thickness (D) of at least 5. Preferably, the aspect ratio of the fibrous reinforcing agent is at least 10, more preferably at least 20, still more preferably at least 50.

Finely dispersed elementary metal is understood herein to be elementary metal dispersed, in the form of small particles, in a continuous polymeric medium. The continuous polymeric medium forms a continuous phase and can consist of, for example, a thermoplastic polymer or a carrier polymer.

In the compositions according to the invention metal powder of a Group VB-VIIIB transition metal or mixtures thereof are used. A metal powder is understood herein to be elementary metal present in the form of particles, the majority of which having a small particle size. Typically such a material has a particle size distribution with the majority of the particles have a particle size of for example, of at most 2 mm. In general, the elementary metal has a weight average particle size (dm) of at most 1 mm. The weight average particle size is determined as $D_m$ according to ASTM standard D1921-89, method A.

Preferably dm is at most 500 μm. Suitably; dm is at most 400 μm, or 300 μm. It is further preferred that the elementary metal has a weight average particle size of at most 200 μm, more preferably at most 100 μm, and still more preferably at most 50 μm. The elementary metal may have a very small particle size with a weight average particle size of, for example, 10 or 5 μm and even lower. Most suitably, dm is at most 1-150 μm. The advantage of a smaller weight average particle size is that the metal powder is a more effective heat-stabilizer.

Preferably, the metal powder that is used in the compositions according to the invention comprises elementary iron, more preferably the metal powder consists, at least essentially, of elementary iron.

Suitable metal powder of a Group VB-VIIIB transition metal, which can be used for the preparation of the moulding compositions according to the invention, is, for example, SCM Iron Powder A-131, available form SMC Metal Products, Ohio, which powder comprises elementary iron.

The amount of elementary metal used for preparing the moulding compositions according to the invention can be varied over a wide range. The Group VB-VIIIB transition metals, and in particular elementary iron, are very effective stabilisers, showing an effect already at very low amounts. Practically, these elementary metal can be used in an amount of at least 0.01 parts by weight (further herein abbreviated as "pbw"), relative to 100 pbw of the polymer composition in the moulding composition. More preferably the amount of the elementary metal is at least 0.05 pbw, still more preferably at least 0.10 pbw, and most preferably at least 0.20 pbw, relative to 100 parts by weight of polymer composition in the moulding composition. The advantage of a higher amount of elementary metal, relative to the weight of polymer composition in the moulding composition, is that the composition has better heat-ageing properties.

On the other hand the amount may be as high or even higher than 10 parts by weight, relative to 100 parts by weight of polymer composition in the moulding composition. However, with 2 to 5 pbw relative to 100 parts by weight of thermoplastic polymer already such good heat aging properties are obtained that use of a higher amount brings relative little improvement.

The metal powder that is used for preparing the moulding compositions according to invention may suitably have the form of a masterbatch of a metal powder finely dispersed in a carrier polymer. Also the moulding compositions according to invention may suitably consist of a dry blend of ingredients comprising a masterbatch of the metal powder finely dispersed in a carrier polymer. The carrier polymer that can be used in the masterbatch may be the same as the at least one thermoplastic polyamide in the polymer composition, as well as another polymer, such as a lower melting thermoplastic polymer, an elastomer or a rubber.

In a preferred embodiment, the carrier polymer is the same polymer as the thermoplastic polyamide. The advantage thereof is maximum compatibility between carrier polymer and thermoplastic polyamide.

In another preferred embodiment, the carrier polymer is an elastomer or a rubber. This has the advantage that the composition according to the invention has improved impact resistance, while the need for adding a separate impact modifier is reduced or can be avoided completely.

Suitable rubbers that can be used as the carrier polymer are for example, SBS rubber and EPDM rubber.

The carrier polymer may also advantageously be a thermoplastic polymer, more particularly a thermoplastic polymer with a low melting temperature. Suitable low melting thermoplastic polymers that can be used as a carrier polymer are, for example, polyethylene (PE), polypropylene (PP), PE/PP copolymers, polyamides (PA) and polyesters (PES).

The masterbatch of elementary metal finely dispersed in a carrier polymer may be prepared, for example, by adding elementary metal powder having a small average particle size, to a melt of a carrier polymer in a melt-mixing apparatus, such as an extruder.

A masterbatch of elementary metal finely dispersed in a carrier polymer, suitable for use in the process according to the invention is, for example, Shelfplus O2 2400, a masterbatch of elementary iron, ex Ciba, Switzerland.

The thermoplastic polyamide that can be used in the moulding compositions according to the invention, may be any type of thermoplastic polyamide suitable for use in reinforced moulding compositions for applications involving exposure to elevated temperature. The thermoplastic polyamide can be, for example, an amorphous polymer or a semi-crystalline polymer. The thermoplastic polyamide may optionally also be a thermoplastic elastomer, or a crystalline polymer, such as a liquid crystalline polymer.

Suitable polyamides that can be used in the moulding compositions according to the invention are, for example, aliphatic polyamides, semi-aromatic polyamides and mixtures thereof.

Suitable aliphatic polyamides are, for example, PA-6, PA-11, PA-12, PA-4,6, PA-4,8, PA-4,10, PA-4,12, PA-6,6, PA-6,9, PA-6,10, PA-6,12, PA-10,10, PA-12,12, PA-6/6,6-copolyamide, PA-6/12-copolyamide, PA-6/11-copolyamide, PA-6,6/11-copolyamide, PA-6,6/12-copolyamide, PA-6/6,10-copolyamide, PA-6,6/6,10-copolyamide, PA-4,6/6-copolyamide, PA-6/6,6/6,10-terpolyamide, and copolyamides obtained from 1,4-cyclohexanedicarboxylic acid and 2,2,4- and 2,4,4-trimethylhexamethylenediamine, and copolyamides of the aforementioned polyamides.

Suitable semi-aromatic polyamides are, for example, PA-6,I, PA-6,I/6,6-copolyamide, PA-6,T, PA-6,T/6-copolyamide, PA-6,T/6,6-copolyamide, PA-6,I/6,T-copolyamide, PA-6,6/6,T/6,I-copolyamide, PA-6,T/2-MPMD,T-copolyamide (2-MPMD=2-methylpentamethylene diamine), PA-9, T, PA-9T/2-MOMD,T (2-MOMD=2-methyl-1,8-octamethylenediamine), copolyamides obtained from terephthalic acid, 2,2,4- and 2,4,4-trimethylhexamethylenediamine, copolyamide obtained from isophthalic acid, laurinlactam and 3,5-dimethyl-4,4-diamino-dicyclohexylmethane, copolyamides obtained from isophthalic acid, azelaic acid and/or sebacic acid and 4,4-diaminodicyclohexylmethane, copolyamides obtained from caprolactam, isophthalic acid and/or terephthalic acid and 4,4-diaminodicyclohexylmethane, copolyamides obtained from caprolactam, isophthalic acid and/or terephthalic acid and isophoronediamine, copolyamides obtained from isophthalic acid and/or terephthalic acid and/or other aromatic or aliphatic dicarboxylic acids, optionally alkyl-substituted hexamethylenediamine and alkyl-substituted 4,4-diaminodicyclohexylamine, and copolyamides of the aforementioned polyamides.

The polyamide may optionally contain modified end groups, for example amine end groups modified with a monocarboxylic acid and/or carboxylic acid end groups modified with a mono-functional amine. Modified end-groups in the polyamide may advantageously be applied for improved melt-stability of the composition during its preparation by melt mixing or during a moulding process of said composition.

Preferably polyamides are chosen from the group consisting of PA-6, PA-6,6, PA-6,10, PA-4,6, PA-11, PA-12, PA-12,12, PA-6,I, PA-6,T, PA-6, I/6,T-copolyamide, PA-6,T/6,6-copolyamide, PA-6,T/6-copolyamide, PA-6/6,6-copolyamide, PA-6,6/6,T/6,I-copolyamide, PA-6,T/2-MPMD,T-copolyamide, PA-9,T, PA-9T/2-MOMD,T-copolyamide, PA-4,6/6-copolyamide and mixtures and copolyamides of the aforementioned polyamides. More preferably PA-6,I, PA-6,T, PA-6,I/6,T-copolyamide, PA-6,6, PA-6,6/6T, PA-6,6/6,T/6,I-copolyamide, PA-6,T/2-MPMD,T-copolyamide, PA-9,T, PA-9T/2-MOMD,T-copolyamide or PA-4,6, or a mixture or copolyamide thereof, is chosen as the polyamide.

Generally, the at least one thermoplastic polyamide used in the compositions according to the invention and intended for high-temperature-use applications is a semi-crystalline or crystalline polymer or a thermoplastic elastomer, having a melting temperature (Tm-1) of at least 180° C., or an amorphous polymer having a glass transition temperature (Tg-1) of at least 180° C. Tm-1 and Tg-1 are denoted together herein as T1.

Preferably, the at least one thermoplastic polyamide in the composition according to the invention has a melting temperature, or where the thermoplastic polyamide is an amorphous polymer a glass transition temperature, of at least 200° C., more preferably of at least 220° C., still more preferably of at least 240° C. The advantage of a higher melting temperature or glass transition temperature for the thermoplastic polyamide in the moulding compositions according to the invention, is that the heat distortion temperature (HDT) of the moulding compositions is higher and more particularly that the effect of the elementary metal on the heat-ageing properties at the temperature corresponding with said higher HDT is more emphasized, allowing a further increase in the maximum use temperature for the composition.

In a preferred embodiment of the invention, the polymer composition in the moulding composition comprises, next to the at least one thermoplastic polyamide having T1 as described above, a second thermoplastic polymer being a semi-crystalline polymer having a melting temperature (Tm-2) or an amorphous polymer having a glass transition temperature (Tg-2), wherein Tm-2 and Tg-2 together are denoted as T2, and wherein T2 is at least 20° C. lower than T1.

The advantage of the moulding composition according to the invention wherein the polymer composition comprises, next to the at least one thermoplastic polyamide, denoted as the first thermoplastic polymer with T1, a second thermoplastic polymer having a melting temperature, or where applicable as described above a glass transition temperature, T2, at least 20° C. lower than the corresponding temperature T1 for the first thermoplastic polyamide, is that the heat ageing properties of the moulding composition at temperatures around or above T2 is increased. A further advantage thereof is that the amount of the elementary metal, in particular iron, can be limited thereby keeping the deleterious effect of iron on the melt stability of polymers like polyamides better under control.

More preferably, T2 is at least 30° C., still more preferably at least 40° C. and most preferably at least 60° C. lower than T1.

In a preferred embodiment of the invention the polymer composition in the moulding composition according to the invention comprises a blend of a first polymer, being either a semi-crystalline thermoplastic polyamide or an amorphous thermoplastic polyamide with T1 at least 260° C., and a second thermoplastic polymer with a T2 of at most 240° C. More preferred, the second polymer is a semi-crystalline or amorphous polymer with T2 of at most 220° C., more preferably at most 200° C. and still more preferably at most 180° C.

The thermoplastic polymer that can be used as the second in the moulding compositions according to the invention, may be any type of thermoplastic polymer suitable for use in reinforced moulding compositions for applications involving exposure to elevated temperature. The thermoplastic polymer can be, for example, an amorphous polymer or a semi-crystalline polymer. The thermoplastic polymer may optionally also be a thermoplastic elastomer, or a crystalline polymer, such as a liquid crystalline polymer.

Suitable amorphous polymers that can be used as the thermoplastic polymer in the composition according to the invention are, for example, polyimides (PI) polyethersulfones (PES), polyetherimides (PEI), polysulfones (PSU), polyarylates (PAR), and amorphous polyamides.

Suitable semi-crystalline polymers are, for example, polyetheretherketones (PEEK), semi-crystalline polyamides, polyphenylesulfides (PPS), and semi-aromatic thermoplastic polyesters.

The thermoplastic polymer may also comprise a blend of different thermoplastic polymers.

Suitable semi-aromatic thermoplastic polyesters that can be used in the composition according to the invention are, for example, poly(alkylene terephthalate)s, like polybutyleneterephthalate (PBT), polytrimethyleneterephthalate (PTT), polyethyleneterephthalate (PET), polycyclohexanedimethyleneterephthalate (PCT), and poly(alkylene naphthanate)s, like polyethylenenaphthanate (PEN), and any copolymers and any mixtures thereof or copolymers thereof with a minority content of another dicarboxylic acid or diol.

Suitable thermoplastic polyamides that can be used as the second thermoplastic polymer in the moulding compositions according to the invention can be selected from the same general classes of thermoplastic polyamides indicated above for the at least one thermoplastic polyamides.

The first and the second thermoplastic polymer may be of the same kind as well as of a different general class.

Preferably, the first and the second thermoplastic polymer are of the same kind, i.e. both thermoplastic polymers are polyamide. Even more preferred, both polyamides are semi-crystalline polymers. In a still more preferred embodiment of the invention, the polymer composition in the moulding composition according to the invention comprises a blend of a semi-crystalline polyamide having a melting point being at least 260° C., and a second polyamide with T2 being less than 240° C.

Suitable polyamide combinations, are for examples combinations wherein the first polyamide is selected from the group of PA4,6 and semi-aromatic polyamides and the second polyamide is selected from the group of aliphatic polyamides comprising PA-6, PA-11, PA-12, PA-6,10, PA-6,12, PA-10,10, PA-12,12, PA-6/6,6-copolyamide, PA-6/12-copolyamide, PA-6/11-copolyamide, PA-6,6/11-copolyamide, PA-6,6/12-copolyamide, PA-6/6,10-copolyamide, PA-6,6/6,10-copolyamide.

The second thermoplastic polymer, if used, is preferably present in an amount of 0.1 to 50 mass %, more preferably 5-30 mass %, and most preferably 10-25 mass %, relative to the total mass of the polymer composition.

Apart from the thermoplastic polymers, the polymer composition in the moulding composition according to the invention may comprise other polymer components, for example a polymer that is used as a carrier for the metal powder. Likewise the other polymer component is a rubber. Preferably, other polymer components are present in the composition according to the invention in an amount of at most 20 mass %, more preferably at most 10 mass %, and most preferably at most 5 mass %, relative to the total mass of the polymer composition. In other words, the polymer composition in the moulding compositions according to the invention preferably comprise the thermoplastic polymer or thermoplastic polymers in an amount of at least 80 mass %, more preferably at least 90 mass %, and still more preferably at least 95 mass %, relative to the total mass of the polymer composition.

In the embodiments, wherein the polymer composition in the moulding compositions according to the invention comprises a blend of polymers, for example a blend of a first and a second thermoplastic polymer, or of the at least one thermoplastic polymer and other polymer components, the first thermoplastic polymer, i.e. the thermoplastic polymer with the highest melting temperature, or where applicable the highest Tg, is generally present in an amount of at least 50 mass %, relative to the total mass of the polymer composition. Preferably, the first thermoplastic polymer is present in an amount of at least 70 mass %, more preferably at least 80 mass %, relative to the total mass of the polymer composition.

In a preferred embodiment of the invention, the at least one thermoplastic polyamide has a weight average molecular mass Mw of at most 35,000. A lower Mw for the thermoplastic polyamide is particularly advantageous for moulding compositions comprising non-fibrous inorganic fillers and/or fibrous reinforcing agents, making such compositions better suitable for use in injection moulding processes for making injection moulded parts. In particular for moulding composition comprising at least 10 mass % non-fibrous inorganic filler, relative to the total mass of the composition, the thermoplastic polyamide having a weight average molecular mass Mw of at most 50,000 g/mol, more preferably at most 40,000 g/mol, still more preferable at most 30,000 g/mol and most preferably at most 25,000 g/mol provides for better processing behaviour in such injection moulding processes.

The moulding composition according to the invention may also contain inorganic fillers and/or other auxiliary additives, both non-fibrous and preferably non-metallic, providing they do not essentially detract from the invention.

Fillers are herein understood to be particle shaped materials. The particles of the fillers may have a variety of structures, for example, flake, plate, rice, hexagonal, or spherical-like shapes The fillers that may be comprised in the non-fibrous-reinforced moulding composition according to the invention are fillers with an aspect ratio L/D<5. The filler that is used can be any filler with an aspect ratio L/D<5 that is known to the skilled man in the art of making moulding compounds. Suitably the filler is a non-metallic inorganic filler. Suitable non-metallic inorganic fillers include, for example, glass beads, inorganic fillers like bariumsulfate and aluminium silicates, and mineral fillers, such as talcum, calcium carbonate, kaolin, wollastonite, mica, clay and calcined clay. The filler may optionally be surface treated for better compatibility with the thermoplastic polyamide.

Suitably, the filler is present in an amount of 0-300 parts by weight, preferably 10-200 parts by weight, and more preferably 20-100 relative to 100 parts by weight of the polymer composition.

Suitable additives, that may optionally be comprised in the moulding compositions according to the invention are, for example, pigments [for example black pigments, such as carbon black and nigrosine, and white pigments, such as $TiO_2$, and $ZnS$] or pigment concentrates, flame retardants, plasticizers, processing aids [such as mould release agents], stabilizers [such as antioxidants and UV stabilizers], crystallization accelerating agents or nucleating agents, impact modifiers and compatibilizers. A compatibilizer is advantageously used in combination with a carrier polymer having low compatibility with the thermoplastic polyamide resulting in an improved thermal stability of the moulding composition.

These auxiliary additives are generally used in an amount of 0-20 parts by weight, preferably 0.1-10 parts by weight, more preferably 0.2-5 parts by weight, relative to 100 parts by weight of the polymer composition in the moulding composition. Where the composition according to the invention comprises another additive or other additives, said additive is generally present in a total amount of at least 0.01 mass %, preferably at least 0.1 mass %, and still more preferably at least 1 mass % relative to the total mass of the composition.

Preferably, the compositions according to the invention comprise a black pigment. The advantage of the presence of a black pigment is that it masks the surface discoloration of the composition due to heat ageing affects. The black pigments are generally used in an amount of 0.01-2 mass %, preferably 0.1-1 mass %, relative to the total mass of the moulding composition.

The other additives in particular include substances that further promote the heat ageing properties, such as, for example, inorganic salts, acidifying components and mixtures thereof. Examples of suitable inorganic salts include alkali, alkaline earth and transition metal halides, sulphates, nitrates, carbonates, carboxylates, sulphites and phosphates, such as sodium chloride, potassium bromide, potassium iodide, calcium carbonate, magnesium sulphate, cupric nitrate, cupric iodide, cupric acetate and mixtures thereof. Suitable acidifying component are, for example, sodium-phosphor buffers, such as sodium pyrophosphate, like disodiumdihydrogenpyrophosphate.

In a preferred embodiment, the thermo-stabilizing system in the moulding compositions according to the invention comprises, next to the said elementary Group VB-VIIIB transition metal, a second thermostabilizer selected from the group consisting of phenolic thermostabilizers (e.g Irganox 1098), phosphates (e.g. Irgafos 168), aromatic amines and metal salts. Examples of suitable metal salts are for example, nickel dithiocarbamates (like Hastavin VPNiCS1), zinc dithiocarbamates (like hostanox VPZnCS1) and copper salts. The presence of the second thermostabilizer selected from the said group, next to the Group VB-VIIIB transition metal has the advantage that the heat ageing properties of the moulding compositions are even further improved. In particular good results are obtained when the second thermostabilizer is a copper salt.

Preferably the copper salt is a copper halogenide/alkalihalogenide combination. Suitable halogenides include chloride, bromide and iodide; suitable alkali ions include sodium and potassium. A suitable copper halogenide/alkalihalogenide combination is, for example, CuI/KI. Optionally the moulding compositions further comprise a deliquescent substance, such as sodium chloride.

Suitably, the moulding compositions according to the invention comprises the copper salt in an amount of 0.001-2, preferably 0.01-1 parts by weight, relative to 100 parts by weight of the polymer composition.

In a preferred embodiment of the invention, the thermoplastic moulding composition is a non-fibrous-reinforced moulding composition consisting of:
- a) a polymer composition comprising
  - a.1. a first thermoplastic polymer being a semi-crystalline polyamide having a melting temperature (Tm-1) or an amorphous polyamide having a glass transition temperature (Tg-1), wherein Tm-1 and Tg-1 together are denoted as T1 and T1 is at least 200° C. and
  - a.2. a second thermoplastic polymer, being a semi-crystalline polymer having a melting temperature (Tm-2) or an amorphous polymer having a glass transition temperature (Tg-2), wherein Tm-2 and Tg-2 together are denoted as T2 and T2 is at least 20° C. lower than Tm-1.
- b) a thermo-stabilizing system, comprising
  - b.1. the finely dispersed metal powder of a the metal selected from the group consisting of elementary metals from Group VB, VIIB, VIIB or VIIB of the Periodic Table, and mixtures thereof, and having a weight average particle size (dm) of at most 1 mm, and
  - b.2. a copper salt, and, optionally,
- c) non-fibrous inorganic fillers and/or
- d) other auxiliary additives not comprising fibrous reinforcing agents.

In a more preferred embodiment, non-fibrous-reinforced moulding composition consists of:
- a) 100 parts by weight of the polymer composition, comprising
  - a.1. at least 50 mass %, relative to the total mass of the polymer composition, of the first thermoplastic polymer, being a semi-crystalline or amorphous polyamide having a mass average molecular mass of at most 35,000,
  - a.2. the second thermoplastic polymer being a semi-crystalline or amorphous polyamide, wherein T2 is at least 30° C. lower than T1,
- b) b.1. 0.01-20 parts by weight of the finely dispersed powder of elementary iron, and
  - b.2. 0.001-2 parts by weight of copper salt,
- c) 0-200 parts by weight non-fibrous inorganic fillers, and
- d) 0-20 parts by weight of auxiliary additives not comprising fibrous reinforcing agents.

The said metal powder of the metals of Group VB, VIIB, VIIB and VIIIB of the Periodic Table can also advantageously be used in preparing a thermo-stabilized fibrous-reinforced thermoplastic moulding composition comprising:
- a) a polymer composition comprising at least one thermoplastic polyamide,
- b) a thermo-stabilizing system, comprising a finely dispersed metal powder, and
- c) a fibrous reinforcing agent.

The invention therefore also relates to a fibrous-reinforced thermoplastic moulding composition wherein the metal in the metal powder is selected from the group consisting of elementary metals from Group VB, VIIB, VIIB and VIIIB of the Periodic Table excluding iron, and mixtures thereof, and the metal powder has a weight average particle size (dm) of at most 1 mm.

Fibrous-reinforced thermoplastic moulding compositions comprising elementary iron are described in the not-pre-published international patent application PCT/NL/2004/000507 and have been excluded from the claimed fibrous reinforced thermoplastic compositions according to the present invention.

The fibrous-reinforced thermoplastic moulding compositions according to the invention may comprise various thermoplastic polyamides, as well as second thermoplastic polymers, inorganic fillers and/or other auxiliary additives. Suitable thermoplastic polyamides, second thermoplastic polymers, inorganic fillers and/or other auxiliary additives include the same as described above for the non-fibrous-reinforced thermoplastic moulding compositions according to the invention.

In a preferred embodiment of the invention, the thermoplastic moulding composition is a fibrous-reinforced moulding composition comprising:
- a) a polymer composition comprising
  - a.1. a first thermoplastic polymer being a semi-crystalline polyamide having a melting temperature (Tm-1) or an amorphous polyamide having a glass transition temperature (Tg-1), wherein Tm-1 and Tg-1 together are denoted as T1 and T1 is at least 200° C. and
  - a.2. a second thermoplastic polymer, being a semi-crystalline polymer having a melting temperature (Tm-2) or an amorphous polymer having a glass transition temperature (Tg-2), wherein Tm-2 and Tg-2 together are denoted as T2 and T2 is at least 20° C. lower than T1,
- b) a thermo-stabilizing system, comprising
  - b.1. finely dispersed metal powder of the metal selected from the group consisting of elementary metals from Group VB, VIIB, VIIB or VIIB of the Periodic Table excluding iron, and mixtures thereof, and having a weight average particle size (dm) of at most 1 mm, and
  - b.2. a second thermostabilizer selected from the group consisting of phenolic thermo-stabilizers, phosphates, aromatic amines and metal salts, and
- c) fibrous reinforcing agents, and, optionally,
- d) non-fibrous inorganic fillers and/or
- e) other auxiliary additives.

In a more preferred embodiment, the fibrous-reinforced moulding composition consists of:
- a) 100 parts by weight of the polymer composition, comprising
  - a.1. at least 50 mass %, relative to the total mass of the polymer composition, of the first thermoplastic polymer, being a semi-crystalline or amorphous polyamide having a mass average molecular mass of at most 50,000 g/mol,
  - a.2. the second thermoplastic polymer being a semi-crystalline or amorphous polyamide, wherein T2 is at least 30° C. lower than T1,
- b) b.1. 0.01-20 parts by weight of finely dispersed powder of elementary iron, and
  - b.2. 0.001-2 parts by weight of copper salt
- c) 5-300 parts by weight fibrous reinforcing agents,
- d) 0-200 parts by weight non-fibrous inorganic fillers
- e) 0-20 parts by weight of auxiliary additives.

The fibrous reinforcing agent that can be used in the fibrous-reinforced moulding composition according to the invention, may be any type of metallic and non-metallic fibrous reinforcing agent suitable for use in fibre reinforced thermoplastic compositions for use in high temperature applications. A fibrous reinforcing agent is considered herein to be a material having length, width and thickness, wherein the average length is significantly larger than both the width and thickness. Generally, such a material has an aspect ratio L/D, defined as the average ratio between the length (L) and the largest of the width and thickness (D) of at least 5. Preferably, the aspect ratio of the fibrous reinforcing agent is at least 10, more preferably at least 20, still more preferably at least 50.

Suitable non-metallic fibrous reinforcing agents that can be used in the fibrous-reinforced moulding composition according to the invention, are, for example, glass fibres, carbon or graphite fibres, aramide fibres, ceramic fibres, mineral fibres, such as wollastonite, and whiskers. Preferably, glass fibres are chosen. Metallic fibers include fibres such as such as copper, iron and aluminium fibres. Non-metallic fibrous reinforcing agents are preferred in the composition according to the invention in view of the application field envisaged for the composition.

The amount of fibrous reinforcing agent that is used in the fibrous-reinforced moulding composition according to the invention can be varied over a large range. Generally that amount ranges from 5 to 300 parts by weight (pbw) relative to 100 pbw of the polymer composition. Preferably, the amount is 10-235 pbw, more preferably 15-150 pbw, relative to 100 pbw of the polymer composition.

The moulding compounds according to the invention can be prepared using any known melt-mixing process that is suitable for preparing fibre-reinforced and non-fibrous reinforced thermoplastic moulding compositions. Such a process is typically carried out by heating the thermoplastic polyamide above the melting temperature or in case the thermoplastic polyamide is an amorphous polymer above the glass transition temperature of the thermoplastic polyamide, thereby forming a melt of the thermoplastic polyamide.

The preparation can be carried out in a melt-mixing apparatus, for which any melt-mixing apparatus known to the man skilled in the art of preparing polymer compositions by melt mixing can be used. Suitable melt-mixing apparatus are, for example, kneaders, Banburry mixers, single-screw extruders and twin-screw extruders. Preferably, use is made of an extruder fitted with means for dosing all the desired components to the extruder, either to the extruder's throat or to the melt.

In the preparation the constituting components for forming the composition are fed to the melt-mixing apparatus and melt-mixed in that apparatus. The constituting components may be fed simultaneously as a powder mixture or granule mixer, also known-as dry-blend, or may be fed separately. The preparation process is not limited in the way the elementary metal is added. It may be added, for example, as a powder, a dry-blend or premix comprising the thermoplastic polyamide in granulate form and the elementary metal in powder form, or as a masterbatch of finely dispersed elementary metal in a carrier polymer.

The invention also relates to the use of a non-fibrous-reinforced thermo-stabilized moulding composition comprising a finely dispersed metal powder, wherein the metal in the metal powder is selected from the group consisting of elementary metals from Group VB, VIIB, VIIB and VIIIB of the Periodic Table, and mixtures thereof, for making moulded articles for high-temperature-use applications.

The invention relates as well to the use of a fibrous-reinforced thermo-stabilized moulding composition comprising a finely dispersed metal powder wherein the metal in the metal powder is selected from the group consisting of elementary metals from Group VB, VIIB, VIIB and VIIIB of the Periodic Table, and mixtures thereof, for making moulded part for high-temperature-use applications. High-temperature-use applications are herein understood applications which typically involve a use temperature of at least 150° C. Depending on the at least one thermoplastic polyamide that is used in the thermo-stabilized moulding composition, the use temperature can be at least 180° C. or even at least 200° C.

The invention also relates to a process for making a three-dimensional net-shaped moulded part comprising injection moulding of a moulding composition, wherein the moulding composition is a non-fibrous-reinforced thermo-stabilized moulding composition comprising a finely dispersed metal powder of a metal selected from the group consisting of elementary metals from Group VB, VIIB, VIIB and VIIIB of the Periodic Table, and mixtures thereof, a fibrous-reinforced thermo-stabilized moulding composition comprising a finely dispersed metal powder of a metal selected from the group consisting of elementary metals from Group VB, VIIB, VIIB and VIIIB of the Periodic Table, and mixtures thereof, or any of the non-fibrous-reinforced thermo-stabilized moulding compositions or fibrous-reinforced thermo-stabilized moulding composition described in the claims attached hereto, or any of the preferred embodiments thereof described hereabove.

The invention also relates to a three-dimensional net-shaped moulded part consisting of a non-fibrous-reinforced thermoplastic moulding composition or fibrous-reinforced thermoplastic moulding composition according to the invention or any of the preferred embodiments thereof described hereabove.

A three dimensional part is understood herein to be a part with a complex shape having extensions, walls and/or ribs or alike, which prevent the part to be easily, i.e. with low force and without damaging the part, to be converted into a flat shape like a film, a foil or a thin plate, as is the case for many parts used in high temperature applications.

A net shaped moulded part is understood herein to be a part that, after it is moulded, such as by injection moulding, further machining of the part is not necessary, or only to limited extent, such as by removing some flash, because the part has been moulded in its final shape and configuration as actual used. Generally, the part has a thickness of at least 0.5 mm, though the parts may have a lower thickness as well. Preferably, the part has a thickness of at least 1 mm, more preferably at least 2 mm, and still more preferably at least 4 mm. The advantage of the part having a higher thickness is that the mechanical properties are better retained under heat ageing conditions at elevated temperature.

More particular, the moulded part is a moulded part for use in machines and engines, which can be applied, for example, in automotive vehicles, such as personal cars, motor bikes, trucks and vans, general transport means, including trains, aviation and ships, domestic appliances, such as lawn mowers and small engines, and general industry installations, such as in pumps, compressors, conveyor belts, or a moulded part for use in electric and electronic installations, such as in domestic power tools and portable power equipment.

The part may be, for example, an engine part, such as an exhaust system part, a bearing, a gear box, an engine cover, an air duct, an intake manifold, an intercooler end-cap, a castor, or a trolley part, or a non-conductive electronic part (such as connectors, bolts and coil bobbins).

The invention also relates to the use of a moulded part according to the invention in engines, machines, electric and electronic installations, and further to engines, machines and assembled articles comprising a moulded part according to the invention.

The invention furthermore relates to products, including automotive vehicles, general transport means, domestic appliances, and general industry installations, electric and electronic installations, comprising a moulded part according to the invention. The advantage is that, due to the reduced deterioration by exposure to elevated temperature of the moulded part, the service life time of the said products is longer and/or replacement of the said moulded part can be delayed, and/or that the product can be operated at higher temperature, compared with a corresponding product comprising a moulded part made of the known composition comprising a copper iodide/potassium iodide stabilizing system.

The invention is further illustrated with the following examples and comparative experiments.

Materials

PA-6-1 Polyamide 6, type K123, viscosity number 129 ml/g (measured according to ISO 307), (ex DSM, The Netherlands)

PA-6-2 Polyamide 6, type K122, viscosity number 115 ml/g (measured according to ISO 307), (ex DSM, The Netherlands)

PA-6,6 Polyamide-6,6, type S222, viscosity number 115 ml/g (measured according to ISO 307), (ex DSM, The Netherlands)

Release agent Acrawax C (Lubricant) (ex Lonza, Italy)

Compatiblizer-I Maleic anhydride modified polyethylene (ex DSM, The Netherlands)

Elementary iron masterbatch: Masterbatch containing 20 mass % of iron particles, average particle size 30 μm, in PE.

Stabilizing aid A Iodide stabilizer 201 (Copper Iodide/Potassium iodide in a stearate (80/10/10) (ex Ciba, Switzerland)

Non Fibrous filler Stealene B (Talc, D50=11.5 μm) (ex Luzenac, France)

EXAMPLES I AND II AND COMPARATIVE EXPERIMENT A

Examples I and II and Comparative Experiment A relate to polyamide compositions comprising a non-fibrous filler. Examples I and II differ from Comparative Experiment A in that the former compositions comprise 5 wt. % relative to the total weight of the composition, while Example II comprises 1.67 wt. % relative to the total weight of the composition of a further stabilizer aid, these additional components being compensated by a reduced amount of polyamide. These compositions were prepared using a ZSK 25 twin-screw extruder (ex Werner & Fleiderer). The cylinder temperature of the extruder was 275° C., rotation speed of the screws 275 RPM and the throughput 20 kg/hour. All ingredients were added via a hopper at the throat. The compounded material was extruded in the form of strands, cooled in a water bath and cut into granules. The resulting granulate was dried for 16 hours at 105° C. under vacuum.

The dried granulate was injection moulded on an injection moulding machine type 80 (ex Engel) with a screw diameter of 30 mm in the form of test bars with a thickness of 4 mm and conforming ISO 527 type 1A. The temperature of the melt in the injection moulding machine was 280° C.; the temperature of the mould was 80° C.

The test bars were heat-aged in a GRENCO oven (type: GTTS 12500S) at 215° C. After a certain heat ageing time, the test bars were taken out the oven, left to cool to room temperature and tested with respect to the mechanical properties by means of a tensile test according ISO 527 at 23° C.

The compositions and typical test results for Examples I and II and Comparative Experiment A have been collected in Table 1.

EXAMPLE III AND COMPARATIVE EXPERIMENT B

Example III and Comparative Experiment B relate to polyamide compositions comprising a blend of two semi-crystalline polyamides. The compositions of Example III and Comparative Experiment B differ from each other in that Example III comprises 7.1 wt. % of an iron containing masterbatch, compensated by a reduced polyamide content. The compositions were prepared using a ZSK 25 twin-screw extruder (ex Werner & Fleiderer). The cylinder temperature of the extruder was 275° C., rotation speed of the screws 275 RPM and the throughput 20 kg/hour. All ingredients were added via a hopper at the throat. The compounded material was extruded in the form of strands, cooled in a water bath and cut into granules. The resulting granulate was dried for 16 hours at 105° C. under vacuum.

The dried granulate was injection moulded on an injection moulding machine type 80 (ex Engel) with a screw diameter of 30 mm in the form of test bars with a thickness of 4 mm and conforming ISO 527 type 1A. The temperature of the melt in the injection moulding machine was 290° C.; the temperature of the mould was 80° C.

The test bars were heat-aged in a GRENCO oven (type: GTTS 125 00 S) at 215° C. After a certain heat ageing time, the test bars were taken out the oven, left to cool to room temperature and tested with respect to the mechanical properties by means of a tensile test according ISO 527 at 23° C.

The compositions and typical test results for Example III and Comparative Experiment B have been collected in Table 1.

EXAMPLE IV AND COMPARATIVE EXPERIMENT C

Example IV and Comparative Experiment C relate to polyamide compositions comprising a copper containing stabilizing aid. Example IV differs from Comparative Experiment C in that the composition of Example IV contains 7.1 wt. % of an iron containing masterbatch and 2.37 wt. % of a compatibilizer, compensated by a lower polyamide content, the wt. % relating to the total weight of the compositions. The compositions of Example IV and Comparative Experiment C were prepared using a ZSK 25 twin-screw extruder (ex Werner & Fleiderer). The cylinder temperature of the extruder was 260° C., rotation speed of the screws 275 RPM and the throughput 20 kg/hour. All ingredients were added via a hopper at the throat. The compounded material was extruded in the form of strands, cooled in a water bath and cut into granules. The resulting granulate was dried for 16 hours at 105° C. under vacuum.

The dried granulate was injection moulded on an injection moulding machine type 80 (ex Engel) with a screw diameter of 30 mm in the form of test bars with a thickness of 4 mm and conforming ISO 527 type 1A. The temperature of the melt in the injection moulding machine was 260° C.; the temperature of the mould was 80° C.

The test bars were heat-aged in a GRENCO oven (type: GTTS 125 00 S) at 215° C. After a certain heat ageing time, the test bars were taken out the oven, left to cool to room temperature and tested with respect to the mechanical properties by means of a tensile test according ISO 527 at 23° C.

The compositions and typical test results for Example IV and Comparative Experiment C have been collected in Table 1.

TABLE 1

Composition and typical test results for Examples and Comparative Experiments

| Compositions (in wt. %) | Comparative Experiment A | Example I | Example II | Comparative Experiment B | Example III | Comparative Experiment C | Example IV |
|---|---|---|---|---|---|---|---|
| PA6-1 | | | | 25 | 22.63 | 99.66 | 90.19 |
| PA6-2 | 69.7 | 63.03 | 62.79 | | | | |
| PA66 | | | | 75 | 67.9 | | |
| Elementary Iron masterbatch | | 5 | 5 | | 7.1 | | 7.1 |
| Compatibilizer | | 1.67 | 1.67 | | 2.37 | | 2.37 |
| Stabilising aid | | | 0.24 | | | 0.34 | 0.34 |
| Release agent | 0.3 | 0.3 | 0.3 | | | | |
| Non fibrous filler | 30 | 30 | 30 | | | | |
| Mechanical properties | | | | | | | |
| a) Initial | | | | | | | |
| Tensile strength [MPa] | 75 | 71 | 70 | 82 | 75 | 81 | 78 |
| Elongation at break [%] | 3 | 2.5 | 2.4 | 34 | 21 | 42 | 25 |
| b) After 500 hrs at 215° C. | | | | | | | |
| Tensile strength [MPa] | 5 | 60 | 66 | 9 | 59 | 35 | 68 |
| Elongation at break [%] | 0.2 | 1.5 | 2 | 0.5 | 11 | 1.5 | 19 |

The invention claimed is:

1. A non-fibrous-reinforced thermoplastic moulding composition consisting of:
   a) a polymer composition comprising at least one thermoplastic polyamide having a weight average molecular mass Mw of at most 50,000 g/mol, and
   b) 0.05 to 5 parts by weight (pbw) relative to 100 pbw of the polymer composition in the moulding composition of finely dispersed elementary iron powder as a thermo-stabilizing system having a weight average particle size (dm) of at most 100 μm,
   c) a pigment;
   d) one or more substances selected from inorganic salts, acidifying components and mixtures thereof, and, optionally,
   e) at least 10 mass %, relative to the total mass of the composition, of non-fibrous inorganic fillers and/or
   f) other auxiliary additives, not comprising fibrous reinforcing agents, wherein
   the moulding composition exhibits reduced deterioration when exposed to an elevated temperature of 215° C. for a prolonged time period of 500 hours as compared to an identical moulding composition including a CuI/KI stabilization system but not including the elementary iron powder.

2. The moulding composition according to claim 1, wherein the metal powder comprises elementary iron.

3. The moulding composition according to claim 1, wherein the temperature T1 is at least 200° C.

4. The moulding composition according to claim 1, wherein the thermo-stabilizing system comprises a second thermostabilizer selected from the group consisting of phenolic thermostabilizers, phosphates, aromatic amines and metal salts.

5. The moulding composition according to claim 1, wherein the moulding composition consists of:
   a. a polymer composition comprising
      a.1. a first thermoplastic polymer being a semi-crystalline polyamide having a melting temperature (Tm-1) or an amorphous polyamide having a glass transition temperature (Tg-1), wherein each of the melting temperature Tm-1 and the glass transition temperature Tg-1 is denoted as a temperature T1 which is at least 200° C., and
      a.2. a second thermoplastic polymer, being a semi-crystalline polymer having a melting temperature (Tm-2) or an amorphous polymer having a glass transition temperature (Tg-2), wherein each of the melting temperature Tm-2 and the glass transition temperature Tg-2 is denoted as a temperature T2 which is at least 20° C. lower than T1,
   b. a thermo-stabilizing system, comprising:
      b.1. the finely dispersed elementary iron having a weight average particle size (dm) of at most 1 mm, and
      b.2. a copper salt, and, optionally,
   c. non-fibrous inorganic fillers and/or other auxiliary additives not comprising fibrous reinforcing agents.

6. A process for forming a three-dimensional net-shaped moulded part comprising injection moulding of a moulding composition according to claim 1.

7. A moulded part consisting of a non-fibrous-reinforced thermoplastic moulding composition according to claim 1.

8. The moulding composition according to claim 1, wherein the pigment is a black pigment.

9. A non-fibrous-reinforced thermoplastic moulding composition consisting of:
   a) a polymer composition comprising
      a1) at least one semi-crystalline thermoplastic polyamide having a melting temperature (Tm-1) or an amorphous polymer having a glass transition temperature (Tg-1), wherein each of the melting temperature Tm-1 and the glass transition temperature Tg-1 is denoted as a temperature T1, and
      a2) a second thermoplastic semi-crystalline polymer having a melting temperature (m-2) or an amorphous polymer having a glass transition temperature (Tm-2) or an amorphous polymer having a glass transition temperature (Tg-2), wherein each of the melting temperature Tm-2 and the glass transition temperature Tg-2 is denoted as a temperature T2, and wherein T2 is at least 20° C. lower than T1,
   b) 0.05 to 5 parts by weight (pbw) relative to 100 pbw of the polymer composition in the moulding composition of the finely dispersed elementary iron powder as a thermo-stabilizing system having a weight average particle size (dm) of at most 100 μm,
   c) a pigment;
   d) one or more substances selected from inorganic salts, acidifying components and mixtures thereof, and, optionally, e) non-fibrous inorganic fillers and/or f) other auxiliary additives, not comprising fibrous reinforcing agents, wherein the moulding composition exhibits reduced deterioration when exposed to an elevated temperature of 215° C. for a prolonged time period of 500 hours as compared to an identical moulding composition including a CuI/KI stabilization system but not including the elementary iron powder.

10. The moulding composition according to claim 9, wherein the pigment is a black pigment.

11. A non-fibrous-reinforced thermoplastic moulding composition consisting of:

a) a polymer composition comprising at least one thermoplastic polyamide, and b) a thermo-stabilizing system comprising 0.05 to 5 parts by weight (pbw) relative to 100 pbw of the polymer composition in the moulding composition of finely dispersed elementary iron powder having a weight average particle size (dm) of at most 100 μm, and a second thermostabilizer, c) a pigment;

d) one or more substances selected from inorganic salts, acidifying components and mixtures thereof, and, optionally, e) non-fibrous inorganic fillers and/or f) other auxiliary additives not comprising fibrous reinforcing agents, wherein the moulding composition exhibits reduced deterioration when exposed to an elevated temperature of 215° C. for a prolonged time period of 500 hours as compared to an identical moulding composition including a CuI/KI stabilization system but not including the elementary iron powder.

12. The moulding composition according to claim 11, wherein the pigment is a black pigment.

* * * * *